(12) United States Patent
Haridasu et al.

(10) Patent No.: US 8,316,615 B2
(45) Date of Patent: Nov. 27, 2012

(54) MODULAR TOWER AND METHODS OF ASSEMBLING SAME

(75) Inventors: Balaji Haridasu, Karnataka (IN); Biao Fang, Clifton Park, NY (US); Danian Zheng, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/009,326

(22) Filed: Jan. 19, 2011

(65) Prior Publication Data

US 2011/0283652 A1 Nov. 24, 2011

(51) Int. Cl.
*E04C 3/00* (2006.01)

(52) U.S. Cl. .......... 52/745.17; 52/831; 52/845; 52/854; 52/848

(58) Field of Classification Search .............. 52/845, 52/831, 834–836, 843, 844, 848–852, 854, 52/741.14, 745.17
See application file for complete search history.

(56) References Cited

U.S. PATENT DOCUMENTS

| | | | | |
|---|---|---|---|---|
| 835,279 | A * | 11/1906 | Haskell | 52/651.02 |
| 1,765,946 | A * | 6/1930 | Shea | 220/565 |
| 3,034,209 | A * | 5/1962 | Bianca et al. | 29/432 |
| 4,442,153 | A * | 4/1984 | Meltsch | 428/99 |
| 7,116,282 | B2 * | 10/2006 | Trankina | 52/845 |
| 7,159,370 | B2 * | 1/2007 | Oliphant et al. | 52/845 |
| 7,160,085 | B2 | 1/2007 | de Roest | |
| 7,392,624 | B2 * | 7/2008 | Kinzer | 52/194 |
| 7,464,512 | B1 | 12/2008 | Perina | |
| 2005/0102960 | A1 * | 5/2005 | Auman | 52/720.1 |
| 2006/0236648 | A1 * | 10/2006 | Grundman et al. | 52/726.4 |
| 2006/0272244 | A1 | 12/2006 | Jensen | |
| 2007/0294955 | A1 * | 12/2007 | Sportel | 52/40 |
| 2008/0041009 | A1 * | 2/2008 | Cairo et al. | 52/651.07 |
| 2008/0256892 | A1 | 10/2008 | Franke | |
| 2009/0021019 | A1 | 1/2009 | Thomsen | |
| 2010/0071275 | A1 * | 3/2010 | Mathai et al. | 52/40 |

FOREIGN PATENT DOCUMENTS

WO 2005075763 A2 8/2005

* cited by examiner

*Primary Examiner* — Mark Wendell
(74) *Attorney, Agent, or Firm* — James McGinness, Esq.; Armstrong Teasdale LLP

(57) ABSTRACT

A tower assembly for use with a modular tower is provided. The tower assembly includes a plurality of assembly panels each including a pair of opposing circumferential edges, and, a plurality of connectors for use in coupling adjacent assembly panels of the plurality of assembly panels to one another, each connector of the plurality of connectors including an outer flange, an inner flange, and a spacer extending therebetween, the outer flange is spaced a distance from the inner flange such that a first slot and a second slot are defined between the outer and inner flanges, each of the first and the second slots is sized to receive one of the assembly panel circumferential edges therein to enable the adjacent assembly panels to be coupled to one another.

17 Claims, 9 Drawing Sheets

MODULAR TOWER AND METHODS OF ASSEMBLING SAME

BACKGROUND OF THE INVENTION

The subject matter disclosed herein relates generally to modular towers, and more specifically, to assembling sections of a modular tower.

Modular towers structures are often used as bases to support structures, such as wind turbine towers, mobile phone towers, and power poles. Because of their size, such towers are often constructed on site, as the towers themselves are much larger than is practically transportable. Components used with such towers are often assembled off-site. Similar to the tower itself, transportation logistics generally limit the storage size and/or weight of such components.

Tower height is at least partially limited by the dimensions of the base of the tower. As such, a taller tower requires a correspondingly larger base to adequately support the tower structure. To enhance the overall structural integrity and to reduce on-site assembly time, it is generally desirable to assemble the components of the modular tower in as few pieces as possible. However, due to transportation limitations, the overall size of components and sections is limited. As such, the height of the tower may be limited by the size of the unitary components that can be used in light of transportation limitations.

BRIEF DESCRIPTION OF THE INVENTION

In one aspect, a tower assembly for use with a modular tower is provided. The tower assembly comprises a plurality of assembly panels each comprising a pair of opposing circumferential edges, and, a plurality of connectors for use in coupling adjacent assembly panels of the plurality of assembly panels to one another, each connector of the plurality of connectors comprising an outer flange, an inner flange, and a spacer extending therebetween, the outer flange is spaced a distance from the inner flange such that a first slot and a second slot are defined between the outer and inner flanges, each of the first and the second slots is sized to receive one of the assembly panel circumferential edges therein to enable the adjacent assembly panels to be coupled to one another.

In another aspect, a method for assembling a modular tower is provided. The method comprises providing at least one connector each including a first flange, a second flange, and a spacer extending therebetween, providing a plurality of section panels each including a first circumferential edge and a second circumferential edge, inserting the first circumferential edge of a first of the plurality of section panels into a first slot of the connector, wherein the first slot is defined between the first flange and the second flange, inserting the second circumferential edge of a second of the plurality of section panels into a second slot of the connector, wherein the second slot is defined between the first flange and the second flange, and, coupling the connector to the first and second section panels.

In yet another aspect, a modular tower is provided. The modular tower comprises at least one lower tower section comprising a plurality of section panels each comprising a pair of opposing circumferential edges, and, a plurality of connectors for use in coupling adjacent section panels of the plurality of section panels to one another, each of the connectors comprising an outer flange, an inner flange, and a spacer extending therebetween, the outer flange is spaced a distance from the inner flange such that a first slot and a second slot are defined between the outer and inner flanges, each of the first and the second slots is sized to receive one of the section panel circumferential edges therein to enable the adjacent section panels to be coupled together. The modular tower further comprises at least one upper tower section coupled to the lower section.

DETAILED DESCRIPTION OF THE INVENTION

The methods and modular tower components described herein facilitate construction of a modular tower. Specifically, the modular tower components and methods described herein enable construction of tower sections that are larger than unitary tower sections that are limited in size by transportation limitations. Using larger modular tower sections, structurally-sound towers having higher hub heights can be constructed. Moreover, spacer elements described herein facilitate aligning adjacent section panels together during construction, and thus, increase the structural integrity of the assembled tower. Moreover the flanges described herein that are used to connect adjacent tower sections together, facilitate reducing hoop stresses induced to the tower components.

Figure 1:
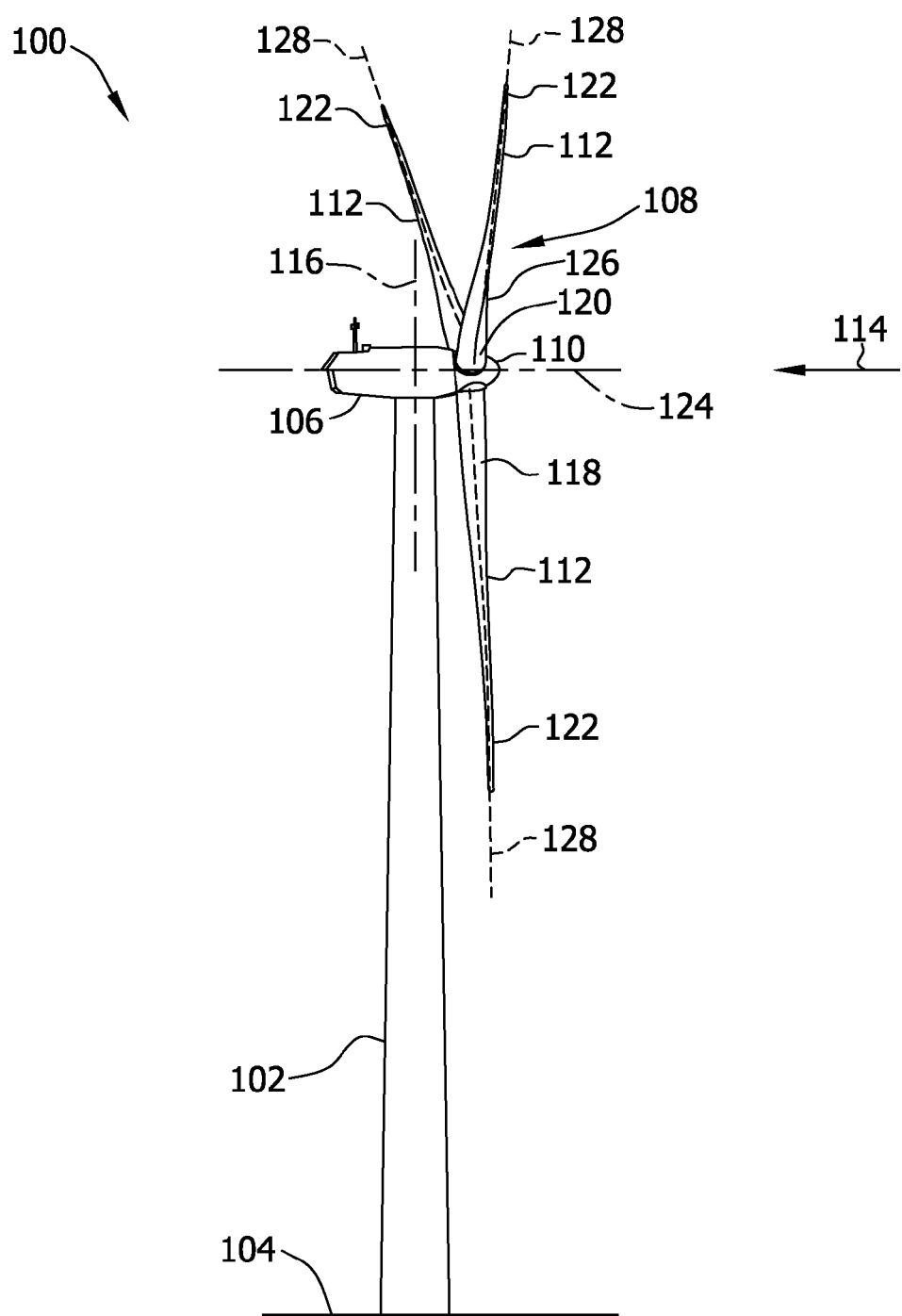
FIG. 1 is a schematic view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
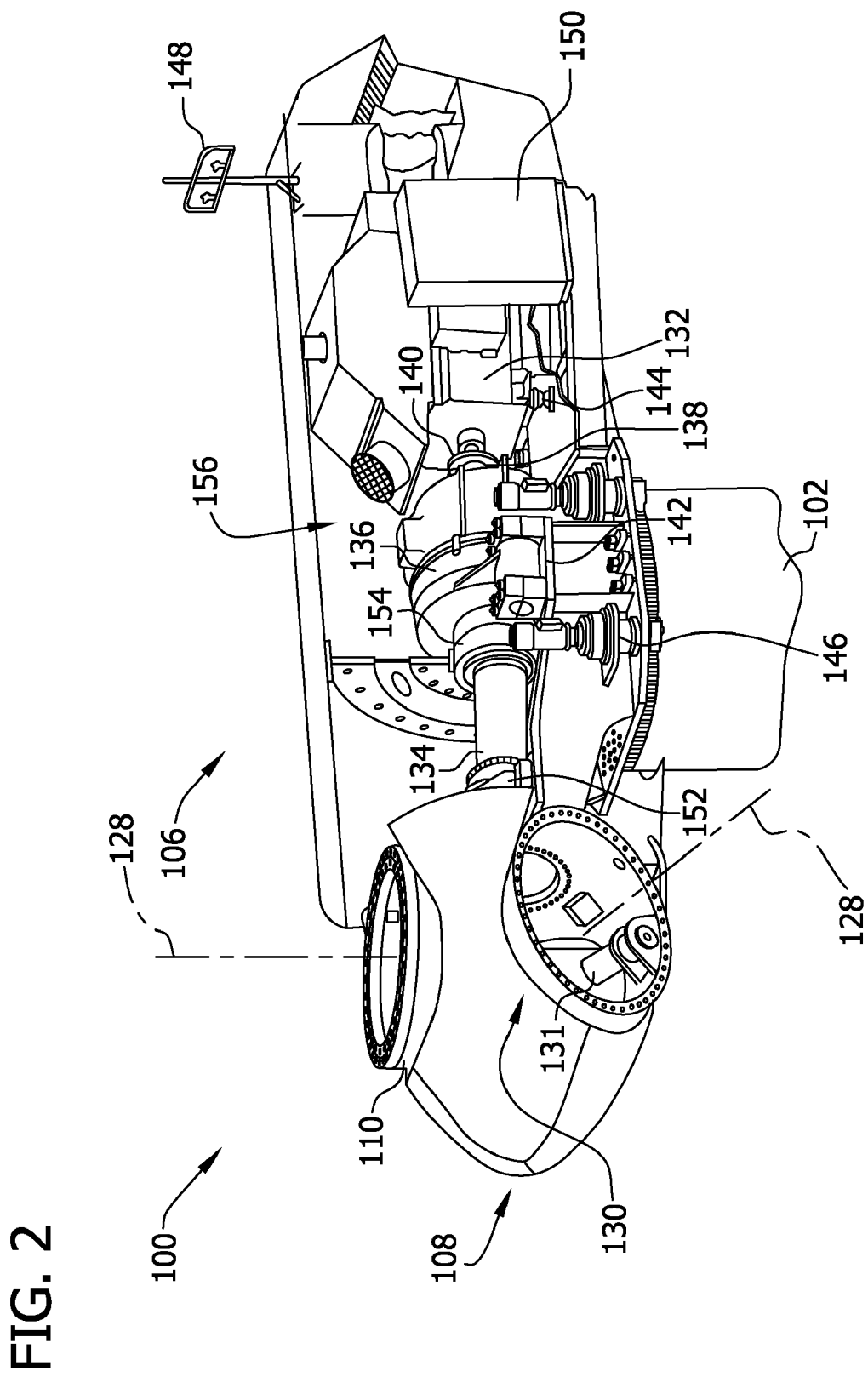
FIG. 2 is a partial sectional view of an exemplary nacelle used with the wind turbine shown in FIG. 1.

FIG. 2 is a partial sectional view of nacelle 106 used with wind turbine 100. In the exemplary embodiment, various components of wind turbine 100 are housed in nacelle 106. For example, in the exemplary embodiment, nacelle 106 includes pitch assemblies 130. Each pitch assembly 130 is coupled to an associated rotor blade 112 (shown in FIG. 1), and modulates a pitch of an associated rotor blade 112 about pitch axis 128. In the exemplary embodiment, each pitch assembly 130 includes at least one pitch drive motor 131.

Moreover, in the exemplary embodiment, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 uses a dual path geometry to drive high speed shaft 138. Alternatively, rotor shaft 134 may be coupled directly to generator 132 via coupling 140.

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that in one embodiment, includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
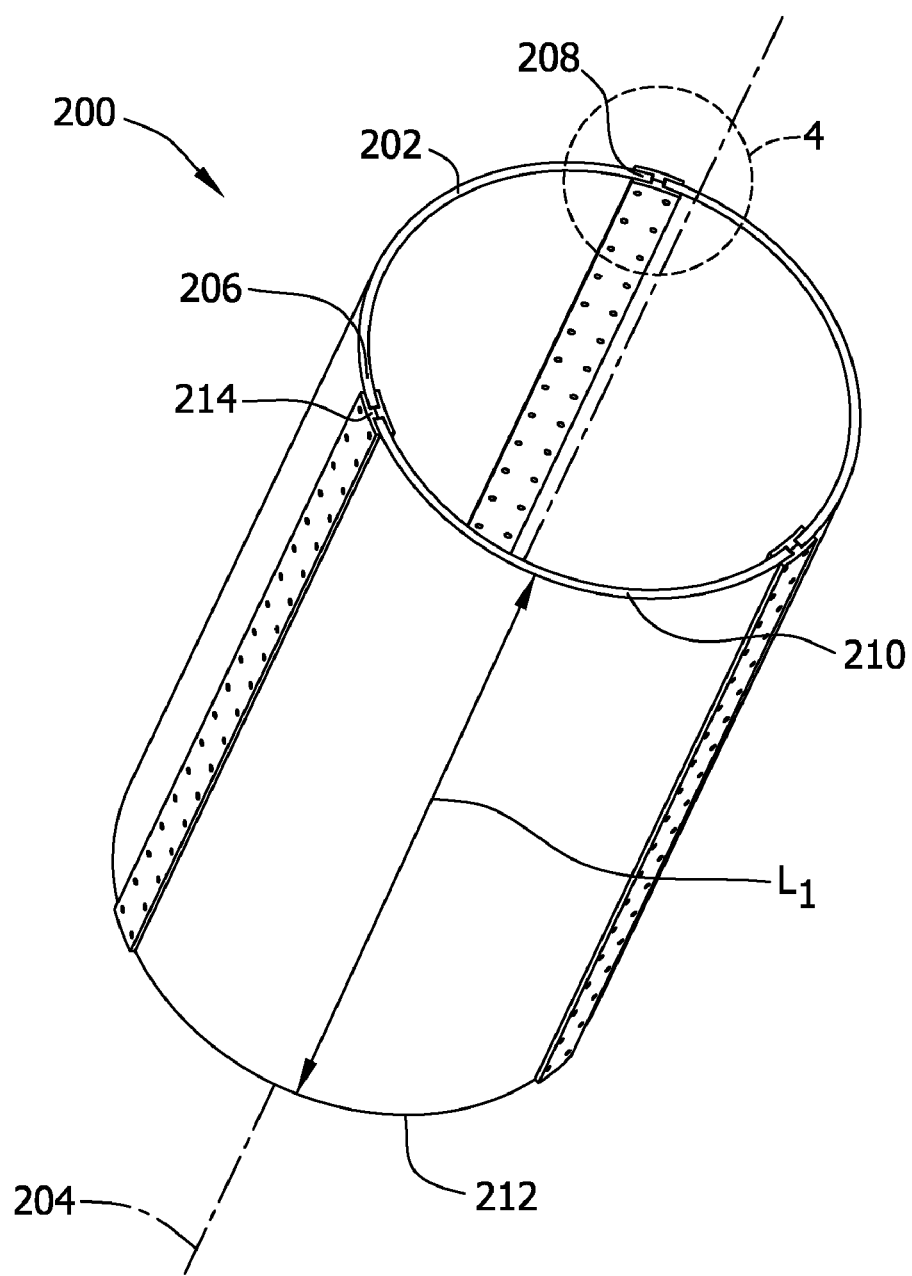
FIG. 3 is a perspective view of an exemplary tower section that may be used with the wind turbine shown in FIG. 1.
Figure 4:
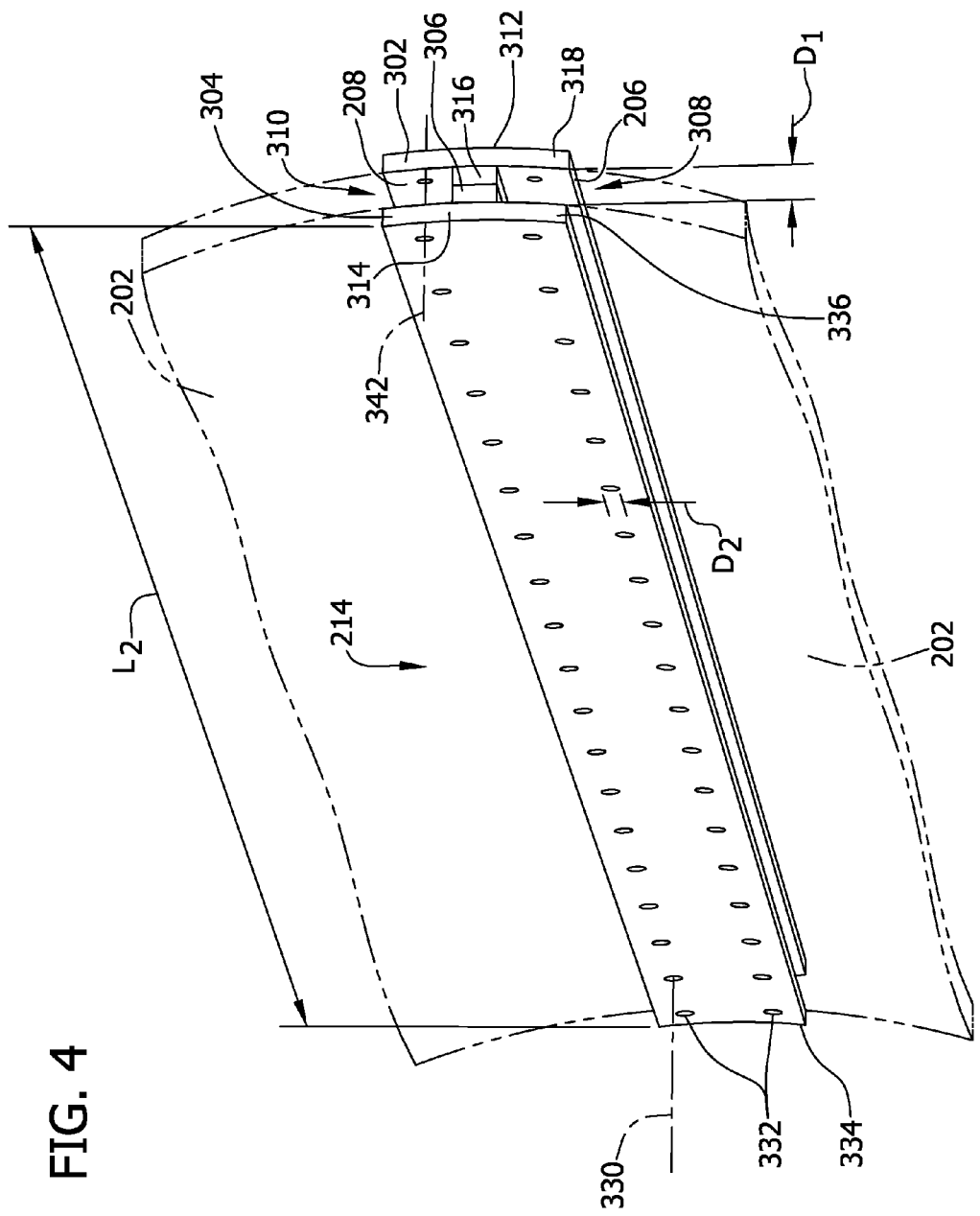
FIG. 4 is an enlarged perspective view of a portion of the tower section shown in FIG. 3 and taken along area 4.

FIG. 3 is a perspective view of an exemplary tower section 200 that may be used in assembling at least a portion of tower 102 (shown in FIG. 1). FIG. 4 is an enlarged perspective view of a portion of tower section 200 taken along area 4. In the exemplary embodiment, tower section 200 is formed from a plurality of arcuate section panels 202. Alternatively, tower section 200 can be formed from a single unitary panel (not shown). Tower section 200 includes a center axis 204 that extends therethrough. Although tower section 200 is illustrated as being conical, tower section 200 can have any shape, including, without limitation, a cylindrical or polygonal shape, that enables tower 102 to function as described herein. Similarly, section panels 202 can have different shapes in addition to those specifically described herein. For example, for a polygonal tower section 200, section panels 202 may be formed with one or more planar surfaces. In the exemplary embodiment, each section panel 202 has a first circumferential edge 206 and an opposing second circumferential edge 208. Section panels 202 can be made of various materials, such as carbon steel. Within a tower, such as tower 102, at least one tower section 200 may be formed with an entry passage (not shown) that enables access to an interior cavity of tower 102 that is at least partially defined by section panels 202. Tower section 200 and each section panel 202 extend from a first axial edge 210 to a second axial edge 212, an axial length $L_1$ defined between first axial edge 210 and second axial edge 212.

In the exemplary embodiment, circumferentially-adjacent panels 202 are coupled together using at least one connector 214 to form tower section 200. Depending on the structure and/or shape of section panels 202, connectors 214 can also vary, as described in more detail below. In the exemplary embodiment, each connector 214 includes an outer flange 302, an opposite inner flange 304, and a spacer 306 that extends between flanges 302 and 304. Specifically, in the exemplary embodiment, outer flange 302, inner flange 304, and spacer 306 are oriented such that a first slot 308 and a second slot 310 are defined within connector 214. More specifically, in the exemplary embodiment, spacer 306 ensures that flanges 302 and 304 are radially spaced a distance $D_1$ apart such that slots 308 and 310 are defined. In one embodiment, connector 214 is fabricated from the same materials, such as carbon steel, used in fabricating section panels 202. Alternatively, connector 214 may be fabricated from a material different than section panels 202, and/or any material that enables tower 102 and tower section 200 to function as described herein.

Connector 214 can include a joint (not shown) or any suitable connecting mechanism that enables connector 214 to couple section panels 202. Further, connector 214 may be fabricated as a unitary connector or fabricated with separate connector components. In the exemplary embodiment, each connector 214 is formed of two T-shaped portions 312 and 314. More specifically, in the exemplary embodiment, wherein section panels 202 are arcuate, T-shaped portions 312 and 314 are also arcuate to facilitate receiving section panels 202. Alternatively, T-shaped portions 312 and 314 may be angular or planar, or any other cross-sectional shape that enables tower 102 and tower section 200 to function as described herein. In the exemplary embodiment, each T-shaped portion 312 and 314 is formed with a spacer extension 316 and a flange extension 318.

When assembled, the spacer extension 316 of first T-shaped portion 312 is against the spacer extension 316 of second T-shaped portion 314 such that slots 308 and 310 are defined between flange extension 318 of each T-shaped portion 312 and 314. T-shaped portions 312 and 314 can be coupled together before or after section panels 202 have been inserted into slot 308 and/or 310, as described in more detail below. Any suitable fastening mechanism or technique may be used to couple spacer extensions 316 to one another. Connector 214 can also be formed from different configurations. For example, in one embodiment, only one T-shaped portion includes a spacer extension and the other T-shaped portion includes only a flange extension. Moreover, in an alternative embodiment, connector 214 does not include spacer 306, but rather includes an outer plate and an inner plate (neither shown). In such an embodiment, adjacent section panels 202 contact one another or are separated by a gap, and are positioned between the outer plate and the inner plate prior to panels 202, the outer plate, and the inner plate being coupled together using any suitable coupling means, such as, bolts, welds, or rivets. In a further alternative embodiment, section panels 202 can be coupled together using only the outer plate or the inner plate.

In the exemplary embodiment, each connector 214 includes a plurality of apertures 330 defined therein that extend therethrough. Although apertures 330 are illustrated as being oriented in circumferential rows, it should be noted that any number of apertures 330 and/or any orientation of apertures 330 that enables connector 214 to couple adjacent section panels 202 together while maintaining the strength and structural integrity of tower section 200 can be used. More specifically, in the exemplary embodiment, apertures 330 are defined in a pair of circumferential rows 332 that each extend from a first end 334 of each connector 214 to a second end 336 of each connector. Moreover, in the exemplary embodiment, connector T-shaped portion 314 is radially inward of T-shaped portion 312, and apertures 330 defined in T-shaped portion 314 are substantially concentrically aligned with apertures 330 defined in T-shaped portion 312. Moreover, apertures 330 are sized and oriented to receive bolts and/or another suitable fastener therethrough that enables section panels 202 to be securely coupled to connectors 214, as described in more detail below. In alternative embodiments, connectors 214 may not include apertures 330, but rather welds and/or rivets are used to couple section panels 202 to connectors 214 (not shown). In the exemplary embodiment, apertures 330 defined in each row 332 in connector 214 are formed with same diameter $D_2$ and shape. Alternatively, apertures 330 in one row 332 may have a different diameter $D_2$ and/or shape than apertures 330 in an adjacent row 332.

Each connector 214 is sized and oriented to couple adjacent section panels 202 together to form tower section 200. In one embodiment, section panels 202 are securely coupled to connector 214. Alternatively, section panels 202 may be removably coupled to connector 214. In the exemplary embodiment, section panels 202 each include a plurality of apertures 342 defined therein. Panel apertures 342 are sized and oriented to align with connector apertures 330. Specifically, in the exemplary embodiment, apertures 342 are oriented in a pair of substantially parallel rows that each extend substantially parallel to circumferential edges 206 and 208. During assembly of tower section 200, first circumferential edge 206 of first section panel 202 is inserted into connector first slot 308, and second circumferential edge 208 of second section panel 202 is inserted into connector second slot 310. After each circumferential edge 206 and 208 is inserted into a respective connector slot 308 and 310, panel apertures 342 are aligned substantially concentrically with respect to apertures 330 defined in connector 214. Accordingly, a suitable fastener, such as a bolt, can be inserted through apertures 330 and 342 such that the fasteners extend through flange extensions 318 and through panel circumferential edges 206 and 208 to enable section panels 202 to be securely coupled together. In the exemplary embodiment, the fasteners extend in a substantially radial direction with respect to section center axis 204.

In the exemplary embodiment, each connector 214 has an axial length $L_2$ measured between ends 334 and 336 that is approximately the same as an axial length $L_1$ of each section panel 202. As such, in the exemplary embodiment, each connector 214 extends along entire axial length $L_1$ of panel circumferential edges 206 and 208. Alternatively, connector 214 only covers a portion of axial length $L_1$ of panel circumferential edges 206 and 208. In such an alternative embodiment, a plurality of connectors 214 may be coupled end-to-end along the full axial length $L_1$ of panel circumferential edges 206 and 208. Alternatively, in such an embodiment, connectors 214 may be spaced along axial length $L_1$.

Figure 5:
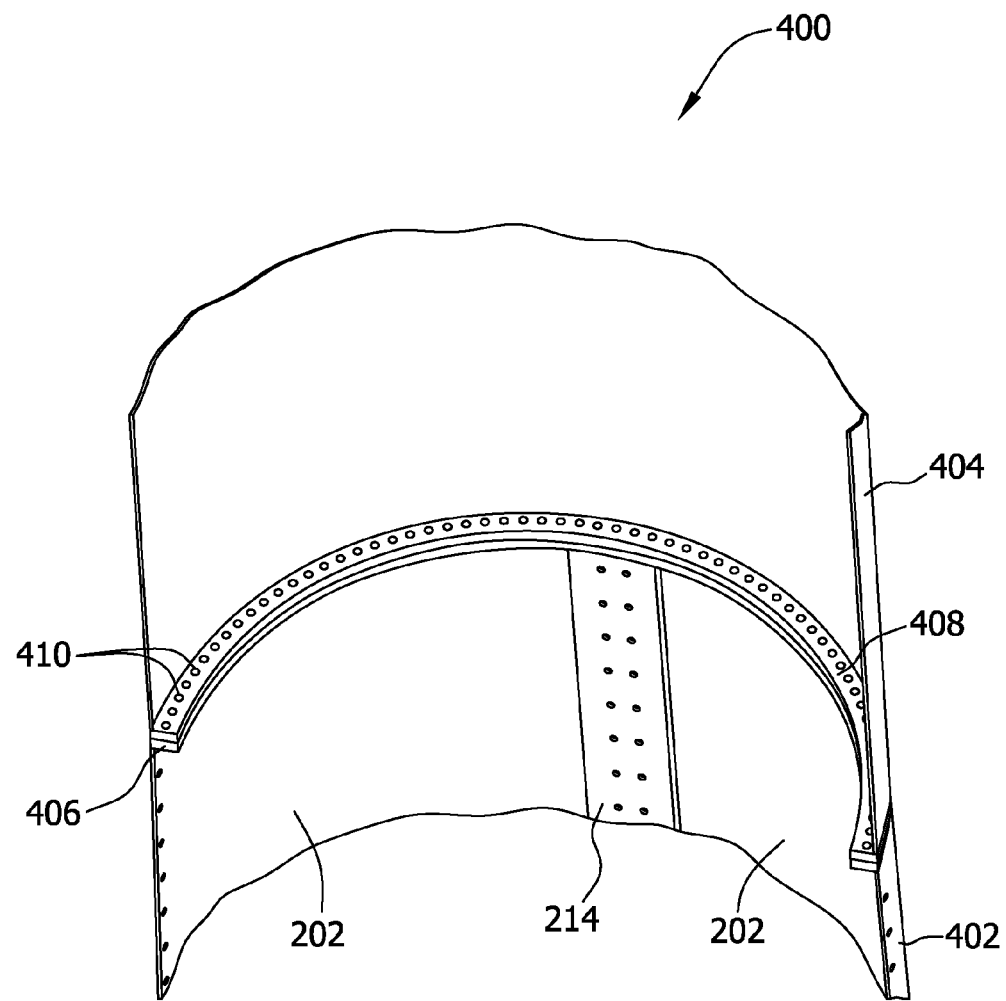
FIG. 5 is a perspective cross-sectional view of a portion of tower sections that may be used with the wind turbine shown in FIG. 1.

FIG. 5 is a perspective cross-sectional view of a portion of alternative tower sections 400 that may be used in assembling at least a portion of tower 102 (shown in FIG. 1). In the exemplary embodiment, tower sections 400 include a lower tower section 402 that is a conical tower section that is formed from section panels 202 as described herein with respect to tower section 200 (shown in FIG. 3), and an upper tower section 404 that is a unitary section. Alternatively, lower tower section 402 could be coupled to another tower section 404 that is formed of section panels 202 as opposed to a unitary tower section (not shown). In one embodiment, to facilitate improving the stability and stiffness of tower 102, when two tower sections 200 that are each formed of section panels 202 are coupled together, the tower sections 200 are oriented such that the connectors 214 on the tower sections 200 are not vertically aligned with each other.

In the exemplary embodiment, upper tower section 404 includes a lower flange 408 that is annular and substantially planar, and lower tower section 402 includes an upper flange 406 that is annular and substantially planar. Moreover, in the exemplary embodiment, each flange 406 and 408 is substantially circular. Flanges 406 and 408 each include a plurality of apertures 410 defined therein that are sized and oriented to receive a plurality of fasteners (not shown) therethrough to enable upper flange 406 to securely couple to lower flange 408. In alternative embodiments, welds or rivets can also be used to securely couple flanges 406 and 408 together. Flanges 406 and/or 408 may be formed unitarily with section panels 202 and/or may be coupled to tower sections 402 and 404. Moreover, although flanges 406 and 408 are illustrated as extending radially inward from tower sections 402 and 404, in other embodiments, at least a portion of flanges 406 and/or 408 could extend radially outward from tower sections 402 and 404.

Figure 6:
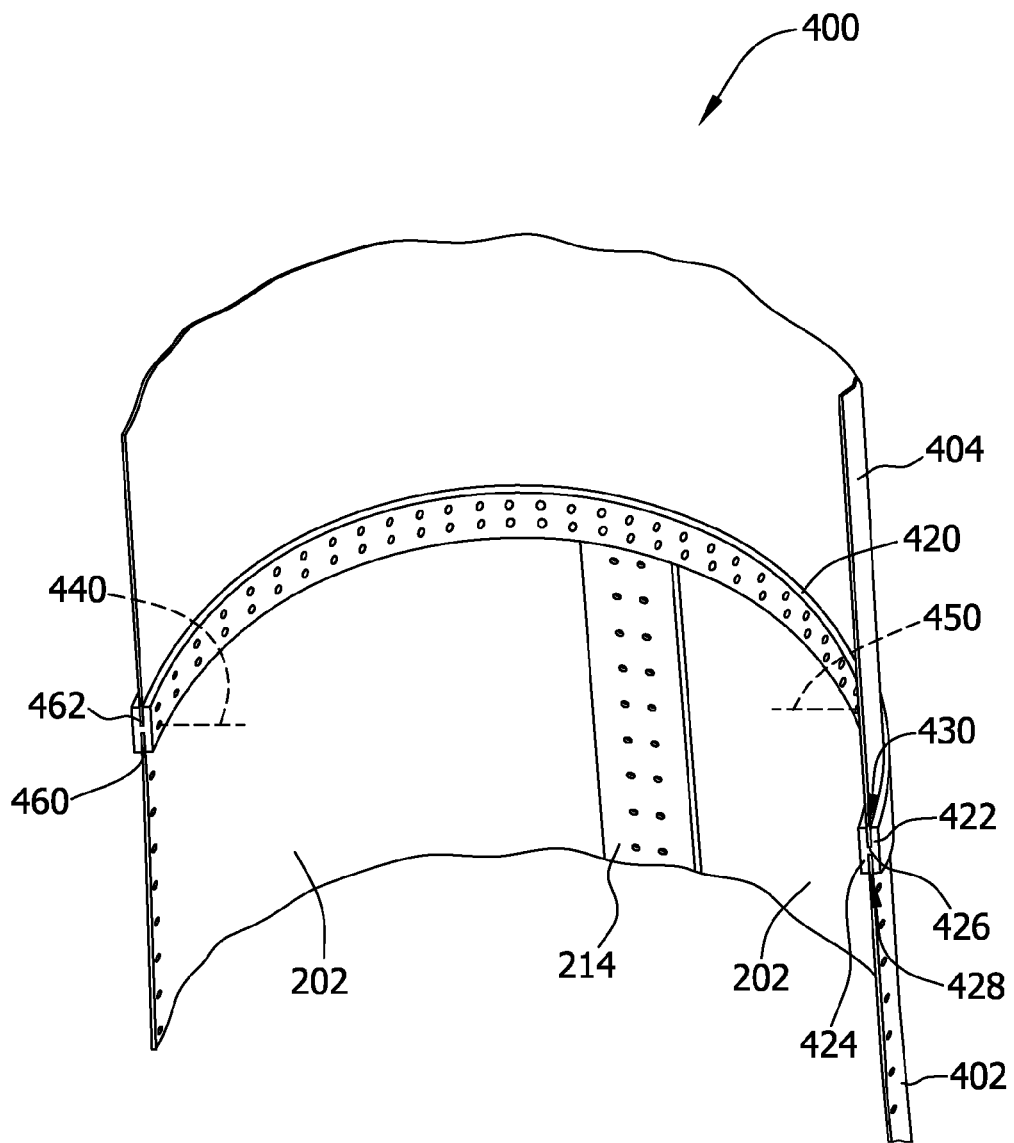
FIG. 6 is a perspective cross-sectional view of a portion of tower sections that may be used with the wind turbine shown in FIG. 1.

FIG. 6 is a perspective cross-sectional view of an alternative connection between a lower tower section 402 and an upper tower section 404. In the exemplary embodiment, a horizontal connector 420 is used to couple lower tower section 402 to upper tower section 404. In the exemplary embodiment, horizontal connector 420 has a structure similar to connector 214. More specifically, horizontal connector 420 includes an outer flange 422, an opposite inner flange 424, and a spacer 426 that extends between flanges 422 and 424. Specifically, in the exemplary embodiment, outer flange 422, inner flange 424, and spacer 426 are oriented such that a lower slot 428 and an upper slot 430 are defined within connector 420.

Horizontal connector 420 can include a joint (not shown) or any suitable connecting mechanism that enables connector 420 to couple lower tower section 402 to upper tower section 404. In the exemplary embodiment, connector 420 is a unitary connector. In alternative embodiments, connector 420 may be fabricated from separate connector components which may be coupled to one another, adjacent to one another, and/or spaced apart from one another. In the exemplary embodiment, horizontal connector 420 includes a plurality of apertures 440 defined therein that extend therethrough, similar to apertures 330 in connector 214. Moreover, apertures 440 are sized and oriented to receive bolts and/or another suitable fastener therethrough that enables lower tower section 402 and upper tower section 404 to be securely coupled to horizontal connector 420. In alternative embodiments, horizontal connector 420 may not include apertures 440, but rather welds and/or rivets are used to couple lower tower section 402 and upper tower section 404 to horizontal connector 420 (not shown). In the exemplary embodiment, lower tower section 402 and upper tower section 404 each include a plurality of apertures 450 defined therein. Apertures 450 are sized and oriented to align with horizontal connector apertures 440.

To couple lower tower section 402 to upper tower section 404, an upper edge 460 of lower tower section 402 is inserted into horizontal connector lower slot 428, and a lower edge 462 of upper tower section 404 is inserted into horizontal connector upper slot 430. After upper edge 460 and lower edge 462 are inserted into lower slot 428 and upper slot 430, respectively, apertures 450 are aligned substantially concentrically with respect to apertures 440 defined in horizontal connector 420. Accordingly, a suitable fastener, such as a bolt, can be inserted through apertures 440 and 450 such that the fasteners extend through horizontal connector 420 and through upper edge 460 and lower edge 462 to enable lower tower section 402 and upper tower section 404 to be securely coupled together.

Figure 7:
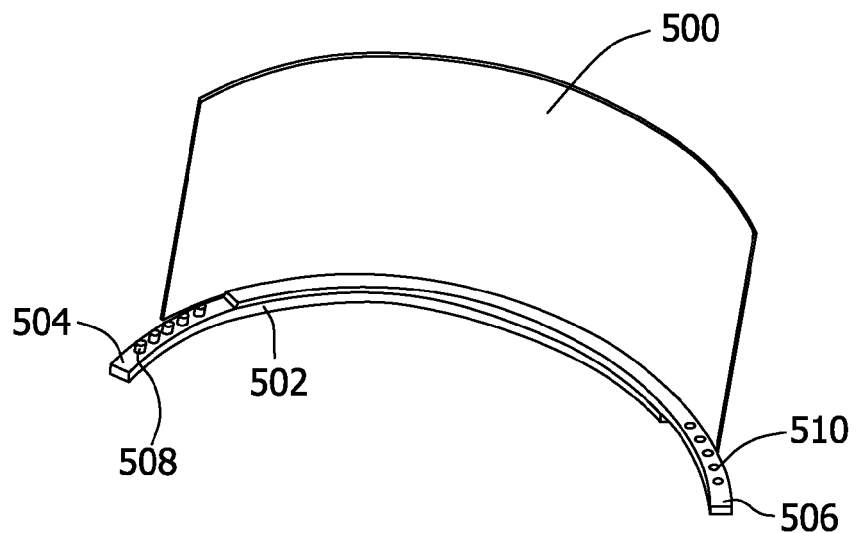
FIG. 7 is a perspective view of an exemplary section panel that may be used with the wind turbine shown in FIG. 1.

FIG. 7 is a perspective view of an exemplary section panel 500 that may be used in assembling at least a portion of tower 102. In the exemplary embodiment, section panel 500 includes an alternative section connector 502. Section connector 502 may be formed unitarily with section panel 500 and/or coupled to section panel 500 using any other suitable means. In the exemplary embodiment, section connector 502 is substantially arcuate and includes a first flange portion 504 and a second flange portion 506. First flange portion 504 is sized and oriented to couple to a second flange portion 506 extending from an adjacent section panel 500. In the exemplary embodiment, first flange portion 504 includes pegs 508 and second flange portion 506 includes corresponding apertures 510 that are sized and oriented to enable first flange portion 504 to couple to a second flange portion 506 extending from an adjacent section panel 500. More specifically, in the exemplary embodiment, flange portions 504 and 506 are substantially planar, and a second flange portion 506 extends from a first section panel 500 and overlaps a first flange portion 504 extending from a second section panel 500 when pegs 508 are inserted into apertures 510 to couple flange portions 504 and 506 together. Alternatively, first flange portion 504 and second flange portion 506 may be coupled together using any other fasteners and/or any suitable coupling means, including, but not limited to, welds or rivets.

When section panels 500 are coupled together using section connectors 502 to form a tower section, section connectors 502 form an annular and substantially planar flange (not shown) that is similar to upper circular flange 406 and lower circular flange 408 (both shown in FIG. 5). In the exemplary embodiment, section connectors 502 are suitably flexible such that in the formed flange, one section connector 502 can flex to reduce hoop stress on the formed flange. Moreover, section connectors 502 are generally less expensive and are generally easier to manufacture then a unitary flange. Furthermore, advantageously, such connectors 502 may also be fabricated unitarily with a section panel 500.

Figure 8:
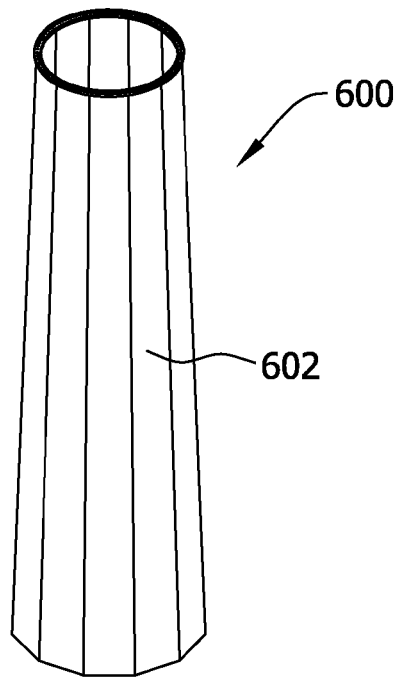
FIG. 8 is a perspective view of an exemplary tower section that may be used with the wind turbine shown in FIG. 1.
Figure 9:
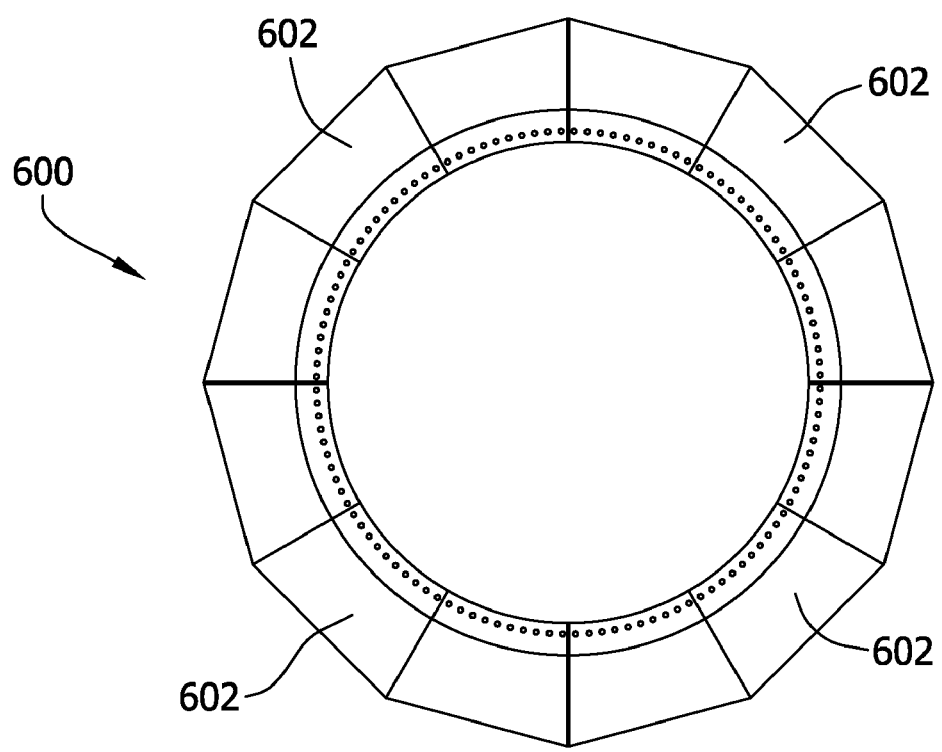
FIG. 9 is a plan view of the tower section shown in FIG. 8.

FIG. 8 is a perspective view of a polygonal tower section 600 that may be used in assembling at least a portion of tower 102 (shown in FIG. 1). FIG. 9 is a plan view of tower section 600. In the exemplary embodiment, tower section 600 is formed from a plurality of section panels 602. In one embodiment, tower section 600 is formed from four section panels 602 that are oriented such that each section panel 602 forms a quarter of tower section 600. Alternatively, tower section 600 can be formed from any number of section panels 602 that enables tower section 600 to function as described herein.

Figure 10:
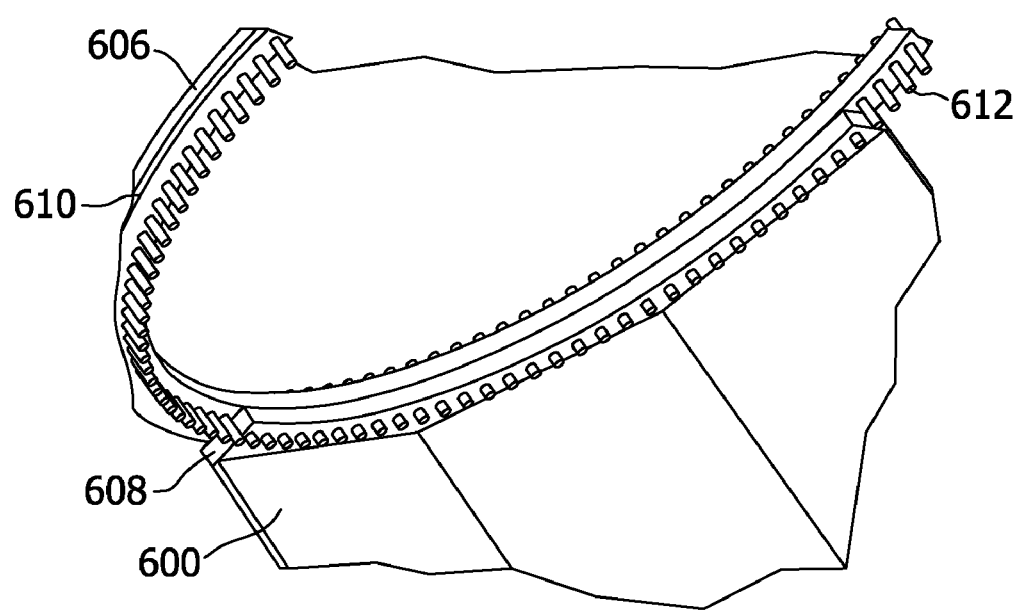
FIG. 10 is an enlarged view of a portion of the tower section shown in FIG. 8.

FIG. 10 is an enlarged view of a portion of a section panel 602 coupled to an alternative tower section 606. In the exemplary embodiment, section panel 602 is coupled to an upper flange portion 608, and tower section 606 is coupled to a lower flange 610. In the exemplary embodiment, tower section 606 is substantially cylindrical, and lower flange 610 is annular, substantially planar, and coupled to upper flange portion 608 using fasteners 612. Alternatively, lower flange 610 and upper flange portion 608 may be coupled together using any other suitable coupling means, including, but not limited to, bolts, welds, or rivets.

As compared to known unitary tower sections, the modular tower sections described herein enable construction of larger tower sections because the section panels can be transported unassembled and independently. Moreover, section panels are generally more inexpensive and simpler to manufacture than unitary tower sections. Further, the connectors described herein improve facilitating the alignment of section panels during assembly because the spacer elements and slots secure the position of the section panels during assembly. Moreover, as compared to unitary flanges, the section connectors described herein facilitate reducing hoop stresses induced to the tower sections because the section connectors are flexible with respect to one another.

The above described modular tower sections and methods provide an improved modular tower. The tower sections include section panels and connectors, which can be transported unassembled and independently, such that larger tower sections than those practically transportable can be assembled on site. As a result, modular towers with higher hub heights can be constructed. Further, the tower sections include a connector including an outer flange, an inner flange, and a spacer to define a first and second slot. The defined slots facilitate positioning and coupling section panels to form the tower section. Moreover, the tower sections include flexible section connectors that couple to one another to form a flange. As a result, the formed flange is better at reducing hoop stress than a unitary flange.

Exemplary embodiments of a modular tower, modular tower sections, and methods for constructing a modular tower are described above in detail. The methods and systems described herein are not limited to the specific embodiments described herein, but rather, components of the systems and/or steps of the methods may be utilized independently and separately from other components and/or steps described herein. For example, the methods and systems described herein may have other applications not limited to practice with wind turbines, as described herein. Rather, the methods and systems described herein can be implemented and utilized in connection with various other industries.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tower assembly for use with a modular tower, said tower assembly comprising:
    a plurality of assembly panels each comprising a pair of opposing circumferential edges; and,
    a plurality of connectors for use in coupling adjacent assembly panels of said plurality of assembly panels to one another, each connector of said plurality of connectors comprising:
        a first T-shaped shaped body portion comprising an outer flange and a first portion extending from said outer flange; and,
        a second T-shaped body portion separate from said first T-shaped body portion and comprising an inner flange and a second portion extending from said inner flange, wherein said first and second portions form a spacer, and wherein said outer flange is spaced a distance from said inner flange such that a first slot and a second slot are defined between said outer and inner flanges, each of said first and said second slots is sized to receive one of said assembly panel circumferential edges therein to enable said adjacent assembly panels to be coupled to one another, wherein each of said connectors is sized to extend along substantially an entire length of said panel circumferential edges.

2. A tower assembly in accordance with claim 1, wherein each of said plurality of assembly panels comprises a plurality of apertures extending therethrough, each of said plurality of assembly panel apertures facilitates securely coupling said adjacent assembly panels to one another.

3. A tower assembly in accordance with claim 2, wherein each of said connector flanges comprises a plurality of apertures defined therein, said plurality of assembly panel apertures and said plurality of connector apertures are oriented to be substantially concentrically aligned when said adjacent assembly panels are coupled to said connector.

4. A tower assembly in accordance with claim 1, wherein each of said plurality of assembly panels has a shape defined at each of said circumferential edges, said connector first and second slots have a shape defined between said outer and inner flanges that substantially mirrors the shape of each of said plurality of assembly panels.

5. A tower assembly in accordance with claim 1, wherein at least one of said plurality of assembly panels comprises one of an arcuate cross-sectional shape and a substantially planar cross-sectional shape.

6. A method for assembling a modular tower, said method comprising:
    providing at least one connector including a first flange, a second flange, and a spacer extending therebetween, wherein the first flange, the second flange, and the spacer define a first arcuate slot and a second arcuate slot;
    providing a plurality of section panels each including a first circumferential edge and a second circumferential edge;
    inserting the first circumferential edge of a first of the plurality of section panels into the first arcuate slot of the connector;
    inserting the second circumferential edge of a second of the plurality of section panels into the second arcuate slot of the connector; and,
    coupling the connector to the first and second section panels such that the connector extends along substantially an entire length of the first panel first circumferential edge and the second panel second circumferential edge.

7. A method in accordance with claim 6, further comprising coupling at least one additional connector to the first of the plurality of section panels.

8. A method in accordance with claim 6, wherein coupling the connector to the first and second section panels comprises inserting a fastener through at least one aperture defined in the first and second section panels and the connector.

9. A method in accordance with claim 6, wherein providing at least one connector further comprises providing at least one connector that is formed from a pair of T-shaped body portions.

10. A method in accordance with claim 6, wherein coupling the connector to the first and second section panels further comprises coupling a plurality of connectors to a plurality of arcuate section panels to form a tower section having a substantially circular cross-sectional profile.

11. A modular tower, comprising:
    at least one lower tower section comprising:
        a plurality of section panels each comprising a pair of opposing circumferential edges;
        a plurality of connectors for use in coupling adjacent section panels of said plurality of section panels to one another, each of said connectors comprising an outer flange, an inner flange, and a spacer extending therebetween, said outer flange is spaced a distance from said inner flange such that a first slot and a second slot are defined between said outer and inner flanges, each of said first and said second slots is sized to receive one of said section panel circumferential edges therein to enable said adjacent section panels to be coupled together, wherein each of said connectors extends along substantially an entire length of said section panel circumferential edges; and, a first annular flange formed from a plurality of arcuate connectors, each of said plurality of arcuate connectors comprising:

a first flange portion; and, a second flange portion sized and oriented to couple to a first flange portion extending from an adjacent one of said plurality of arcuate connectors, said first and second flange portions coupled to one another in an overlapping configuration; and, at least one upper tower section coupled to said lower section.

12. A modular tower in accordance with claim 11, wherein said upper tower section comprises a unitary upper tower section.

13. A modular tower in accordance with claim 11, wherein said upper tower section comprises a second annular flange, said first and said second annular flanges facilitate coupling said upper tower section to said lower tower section.

14. A modular tower in accordance with claim 11, wherein said spacer comprises a first portion extending from said outer flange and a second portion extending from said inner flange.

15. A modular tower in accordance with claim 11, wherein each of said plurality of section panels comprises a plurality of apertures extending therethrough, each of said plurality of panel apertures facilitates securely coupling said adjacent section panels together.

16. A modular tower in accordance with claim 15, wherein each of said connector flanges comprises a plurality of apertures defined therein, said plurality of section panel apertures and said plurality of connector apertures are aligned substantially concentrically when said adjacent section panels are coupled together.

17. A modular tower in accordance with claim 11, wherein said first flange portion comprises a plurality of pegs sized and oriented to engage a plurality of corresponding apertures defined in said second flange portion.

* * * * *